United States Patent [19]
Qin et al.

[11] Patent Number: 6,041,320
[45] Date of Patent: Mar. 21, 2000

[54] MULTI-REGION FUZZY LOGIC CONTROL SYSTEM WITH AUXILIARY VARIABLES

[75] Inventors: Si-Zhao Joe Qin, Austin; Guy Thompson Borders, San Antonio, both of Tex.

[73] Assignee: Fisher Controls International, Inc., Austin, Tex.

[21] Appl. No.: 08/110,506

[22] Filed: Aug. 23, 1993

[51] Int. Cl.⁷ .................................................. G06F 15/18
[52] U.S. Cl. .................................................................. 706/1
[58] Field of Search .............................. 395/3, 900, 61, 395/906, 10

[56] References Cited

U.S. PATENT DOCUMENTS

| | | | |
|---|---|---|---|
| 4,841,815 | 6/1989 | Takahashi | 74/866 |
| 5,012,430 | 4/1991 | Sakurai | 395/11 |
| 5,029,314 | 7/1991 | Katsumi et al. | 355/208 |
| 5,043,862 | 8/1991 | Takahashi et al. | 364/162 |
| 5,051,932 | 9/1991 | Inoue et al. | 395/900 |
| 5,091,844 | 2/1992 | Waltz | 364/153 |
| 5,121,467 | 6/1992 | Skeirik | 395/11 |
| 5,153,807 | 10/1992 | Saito et al. | 364/165 |
| 5,158,024 | 10/1992 | Tanaka et al. | 110/186 |
| 5,159,547 | 10/1992 | Chand | 395/900 |
| 5,165,011 | 11/1992 | Hisano | 395/54 |
| 5,206,566 | 4/1993 | Yoshida et al. | 395/900 |
| 5,245,695 | 9/1993 | Basehore | 395/900 |
| 5,268,835 | 12/1993 | Miyagaki et al. | 395/900 |
| 5,272,621 | 12/1993 | Aoki | 395/900 |
| 5,287,432 | 2/1994 | Tomitaka | 395/900 |

OTHER PUBLICATIONS

ISA Conference and Exhibition on Industrial Automation, "Supervisory Hierarachical Intelligent Control For Medical and Industrial Systems", by D.A. Linkens and M.F. Abbod, Jun. 1992, pp. 1.21–1.24.

ATP Automatisierungstechnische Praxis, "Automation Concepts Based on Fuzzy Control and Classical Control Theory", vol. 35, No. 6, By R. Schreiber and K. Zinser, Jun. 1993, pp. 349–354.

AT Automatisierungstechnik, vol. 41, No. 5, By J. Boll, M. Hottecke and F. Dorrscheidt, May 1993, pp. 145–151.

Proceedings of the 1992 IEEE International Symposium on Intelligent Control, by D.A. Linkens, J.S. Shieh, Aug. 1992, pp. 210–215.

Transactions of the Institute of Measurement and Control, "Supervisory Intelligent Control Using A Fuzzy Logic Hierarchy", vol. 15, No. 3, By D.A. Linkens and M.F. Abbod, 1993, pp. 112–132.

Fuzzy Control Theory: A Nonlinear Case, Ying et al., Automatica, 26(3) pp. 513–520 (1990).

A New Fuzzy Gain Scheduling Algorithm for Process Control, Ling et al., pp. 2284–2290 1992 AC/TP3.

An Introduction Survey of Fuzzy Control, Sugeno, Information Sciences 36, pp. 59–83 (1985).

Bouslama, F. et al., Application of Limit Fuzzy Controllers to Stability Analysis, Jul. 27, No. 2, pp. 103–120.

Kim, Seung–Woo et al., "Fuzzy Compliance Robot Control Using Multi Rule–Base", IEEE International Conference on Fuzzy Systems, Mar. 8–12, 1992, San Diego, California, pp. 1343–1348.

Tsuneo et al, "highly–reliable semi–autonomous vehicle control on lattice lane"; IEEE International Workshop on Intelligent Robots and Systems 90'; p. 731–8 vol. 2; Jul. 3–6, 1990.

Smith et al, "self–tuning of a fuzzy logic controller using a cell state space algorithm"; 1990 IEEE International Conference onSystems, Man and Cybernetics Conference Proceedings; p. 445–50, Nov. 4–7, 1990.

Han et al, "Two–layer multiple–variable fuzzy logic controller"; IEEE Transactions on Systems, Man and Cybernetics, vol. 23, iss. 1 p. 277–85; Jan.–Feb. 1993.

*Primary Examiner*—Tariq R. Hafiz
*Attorney, Agent, or Firm*—Kinney & Lange

[57] ABSTRACT

A fuzzy control system for industrial process control utilizes an auxiliary process variable to determine which of several regions of different gain a non-linear process is operating. Based upon that determination and fuzzy input signals, the fuzzy controller provides a process control signal which corresponds to that region.

33 Claims, 8 Drawing Sheets

AV = Low

| e \ $\Delta_e$ | NL | NS | ZO | PS | PL |
|---|---|---|---|---|---|
| NL | PL | PL | PL | PM | ZO |
| NS | PL | PL | PM | ZO | NM |
| ZO | PM | PM | ZO | NM | NL |
| PS | PS | ZO | NM | NL | NL |
| PL | ZO | NS | NM | NL | NL |

AV = Medium

| e \ $\Delta_e$ | NL | NS | ZO | PS | PL |
|---|---|---|---|---|---|
| NL | PM | PM | PM | PS | ZO |
| NS | PM | PM | PS | ZO | NS |
| ZO | PM | PS | ZO | NS | NM |
| PS | PS | ZO | NS | NM | NM |
| PL | ZO | NS | NM | NM | NM |

AV = High

| e \ $\Delta_e$ | NL | NS | ZO | PS | PL |
|---|---|---|---|---|---|
| NL | PL | PL | PM | PS | ZO |
| NS | PL | PL | PM | ZO | NS |
| ZO | PL | PM | ZO | NM | NM |
| PS | PM | ZO | NM | NL | NL |
| PL | ZO | NM | NL | NL | NL |

MULTI-REGION FUZZY LOGIC CONTROL SYSTEM WITH AUXILIARY VARIABLES

BACKGROUND OF THE INVENTION

The present invention relates to a control system for controlling non-linear processes having more than one region of process operation. In particular, the present invention relates to a fuzzy logic controller which utilizes an auxiliary process variable for determining a region of process operation and selecting a fuzzy membership function for application to a fuzzy input variable to provide a process control input that corresponds to the region of process operation.

Fuzzy logic involves a series of fuzzy control rules which are expressed by a fuzzy implication of the form "if . . . then . . . ." These fuzzy implications include fuzzy variables which are often referred to as "linguistic variables". Fuzzy reasoning or inferences are accomplished by the application of the fuzzy variable to the fuzzy rules.

Fuzzy logic has been used in process control applications as described for example in Tanaka et al., U.S. Pat. No. 5,158,024 incorporated herein by reference. In these control applications, the fuzzy logic forms a fuzzy controller for controlling process parameters. A typical fuzzy logic controller is composed of three basic parts: input signal fuzzification, a fuzzy engine that handles rule inference, and defuzzification that generates continuous signals for actuators such as control valves.

There are several advantages to the use of fuzzy control of process parameters. One advantage is that human experience can easily be integrated into the fuzzy controller because the fuzzy control rules and the fuzzy variable are well suited to the human thought process.

Another advantage of the use of a fuzzy controller is the non-linearity resulting from fuzzification, application of the fuzzy rules to the fuzzy variables, and defuzzification. This non-linearity inherent in the fuzzy control process makes fuzzy controllers well suited to non-linear process control.

However, process controllers that are presently used for process control tend to make use of a process error signal and a change in process error signal as controller inputs for determining a process control or process input signal. These controller inputs do not provide sufficient information to the fuzzy controller so that the process control signal can account for any process non-linearities. Therefore, these fuzzy logic controllers are not capable of compensating for process non-linearities.

There is a present need for fuzzy controllers capable of providing a process control signal for compensating a process having a non-linear process variable such as process gain. This fuzzy controller should be capable of compensating the process throughout the different regions of non-linearity so that the control performance is uniform.

SUMMARY OF THE INVENTION

One aspect of the present invention is a fuzzy logic control system suited for controlling a non-linear process. The fuzzy control system includes a fuzzy controller which utilizes an auxiliary process variable to determine where the process is operating and compensate for process non-linearities.

Another aspect of the present invention is a control system that is suited for providing a process control signal for controlling a non-linear process having first and second regions of operation. The control system includes means for providing an auxiliary process signal having predetermined characteristics is each of first and second regions of process operation.

A fuzzy logic controller is provided which includes a first fuzzy membership function relating a process error signal to the process control signal for process operation in the first region. Also included is a second fuzzy membership function relating the process error signal to the process control signal for process operation in the second region. A fuzzy inference engine is included for applying one of the first and second fuzzy membership functions selected based on the auxiliary process signal value to a process error signal value for inferring a process control signal value.

In one preferred embodiment, the present invention is a control system for controlling a process having non-linear process gain. The process has first and second regions of process gain. The control system includes a circuit that is connected between a process and a fuzzy logic controller. This circuit provides an auxiliary process variable that is indicative for first and second regions of process gain.

The fuzzy logic controller provides a control signal value to the process. The fuzzy logic controller includes a first fuzzy membership function that is selected to provide proportional and integral control suitable for the first region of process gain. A second fuzzy membership function is included that is selected to provide proportional and integral control suitable for the second region of process gain. Also included is a fuzzy engine configured for applying one of the first and second fuzzy membership functions (selected based on a process operation region determined from an auxiliary process variable value to a process error signal value) and a change in process error value. This application of the selected fuzzy membership function allows the fuzzy engine to infer the control signal value for maintaining proper process operation in the first and second regions of process gain.

An additional aspect of the present invention is a control system for controlling a non-linear process as a function of a process error signal. The control system includes means for providing an auxiliary variable signal which is indicative of which of a plurality of operating regions the non-linear process is operating. A fuzzy logic controller is included for providing a process control output signal for controlling the non-linear process as a function of the process error signal and the auxiliary variable signal.

In one preferred embodiment, the present invention is a control system for providing derivative, proportional and integral control of a process having a non-linear process gain for each of a plurality of different operating regions of the process. The control system includes means for providing a process error value and means for providing a change in process error value. Included is means for providing an auxiliary value indicative of one of a plurality of different operating regions the process is operating. Also included is a fuzzy logic controller for providing proportional, integral and derivative control of the process as a function of the process signal error value, the change in process error value and the auxiliary value.

A further aspect of the present invention is a controller for controlling a non-linear process as a function of process error signal and a controller parameter value. The controller parameter value is based on which of a plurality of operating regions the non-linear process is operating. The controller includes a fuzzy engine linked to the non-linear process for providing a process control output signal as a function of the process error signal, the controller parameter value and one of a plurality of sets of fuzzy rules for the different operating regions of the process.

Yet another aspect of the present invention is a method for controlling a non-linear process as a function of a process error signal. The method includes determining a region of process operation from a plurality of operating regions based on an auxiliary process variable signal. The method includes applying one of a plurality of sets of fuzzy rules for the different operating regions of the process to the process error signal for inferring a process control output signal. The fuzzy rule applied is based upon the operating region of the process.

In one preferred embodiment, the method for controlling the non-linear process also includes converting the process error signal to a fuzzy error signal value. In this preferred embodiment, applying one of a plurality of sets of fuzzy rules includes applying one of a plurality of sets of fuzzy rules to the fuzzy process error signal for inferring a process control signal value.

BRIEF DESCRIPTION OF THE DRAWINGS

FIG. 5 is a table illustrating fuzzy inference rules for controlling the non-linear process of FIG. 2a.

DETAILED DESCRIPTION OF THE PREFERRED EMBODIMENTS

Figure 1:
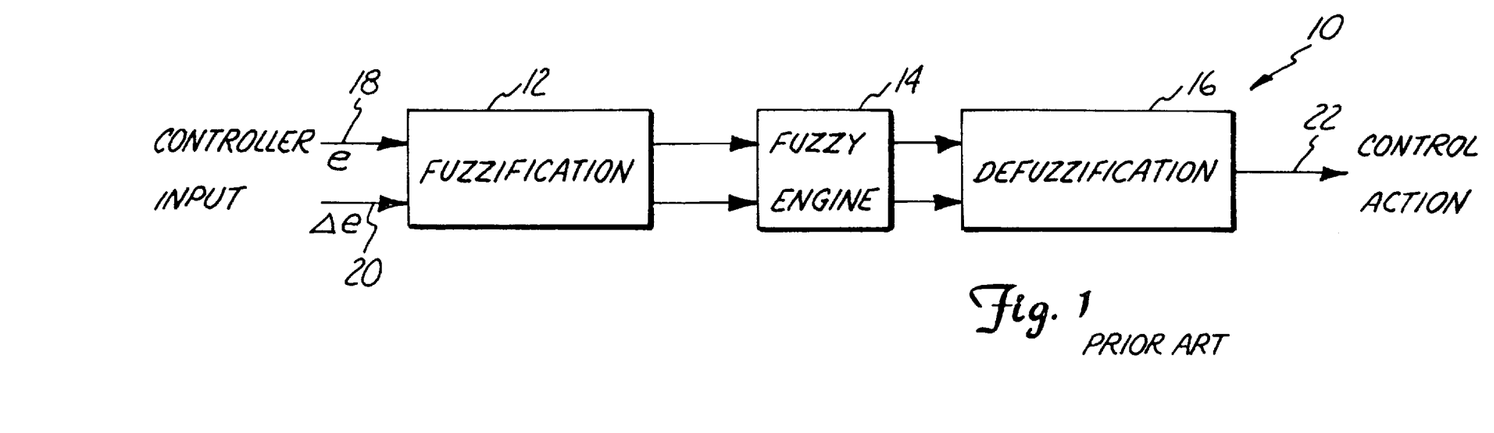
FIG. 1 is a block diagram for a prior art fuzzy logic controller.

Before discussing the fuzzy logic controller of the present invention, it is helpful to first review frequently used fuzzy controllers of the prior art. FIG. 1 shows a fuzzy controller 10 of the prior art. Fuzzy controller 10 includes a fuzzification portion 12, a fuzzy engine 14, and a defuzzification portion 16. Input signals 18 and 20 provided to the fuzzy controller 10 represent continuous signals indicative of process error. Output signal 22 provided by the fuzzy controller 10 is a continuous signal for providing process control.

Often, input signals 18 and 20 provided to the fuzzy controller 10 represent process error (e) and process change in error ($\Delta$e), respectively. For the case of a proportional integral (PI) controller, the process error signal 18 is frequently the difference between a setpoint and a process output signal, and the change in error signal 20 represents the change in the process error signal 18 over a selected sampling interval.

The output signal 22 of the fuzzy controller 10 often is provided to the process for minimizing or reducing the process error represented by fuzzy controller input signals 18 and 20. Output signal 22 is frequently used to activate control elements within the process such as control valves and actuators.

The fuzzification portion 12 converts or transforms the continuous input signals 18 and 20 into linguistic or fuzzy variables at selected sample intervals. These fuzzy variables are derived from human experience such as small, large, positive, and negative, just to name a few. The fuzzy variables are provided the fuzzy engine 14 for performing a fuzzy inference.

The fuzzy engine 14 includes a set of fuzzy rules that are a series of statements of the form "if . . . then . . . " which involve fuzzy variables. The fuzzy variables provided by fuzzification portion 12 are applied to the fuzzy rules by fuzzy engine 14 to infer a control action. This control action which is in the form of a fuzzy variable is provided to the defuzzification portion 16.

The defuzzification portion 16 converts the fuzzy variable representing an inferred control action to a continuous signal represented by output signal 22.

Figure 2A:
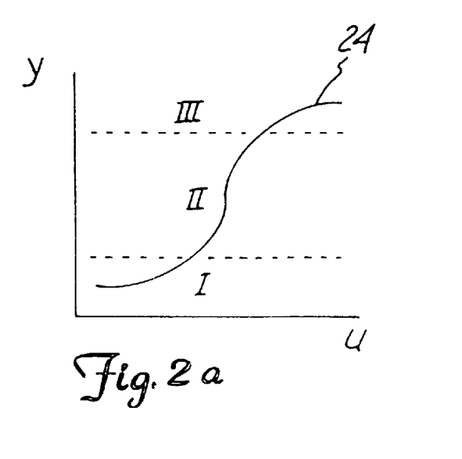
FIGS. 2a and 2b are graphs showing the relationship between process input and process output for processes having non-linear gains.
Figure 2B:
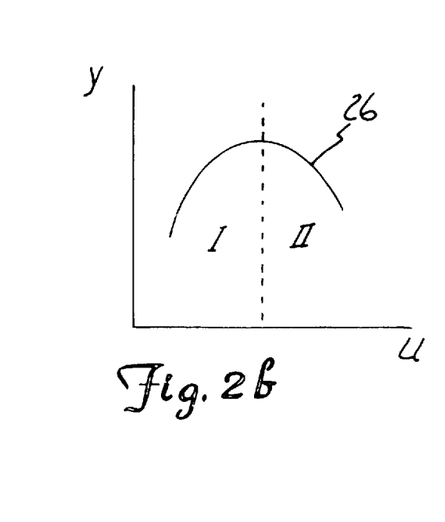

FIG. 2a and 2b are two examples illustrating the process input and process output relationship for two non-linear processes. In each of these figures the horizontal axis represents the process input represented by the variable U and the vertical axis represents the process output represented by the variable Y. A plot 24 shown in FIG. 2a has a sinusoidal shape having two low process gain regions indicated by numerals I and III and one high process gain region indicated by numeral II. A plot 26 shown in FIG. 2b is another example of non-linear process gain. Plot 26 has a region of positive process gain as indicated by numeral I and a region of negative process gain as indicated by numeral II. These examples in FIGS. 2a and 2b are just two examples for illustrative purposes that show process non-linearities which should be compensated for by a process controller.

As discussed previously, PI-type fuzzy controller 10 as shown in FIG. 1 (which makes use of a process error signal 18 and a change in process error signal 20) does not differentiate between high gain regions represented by numeral II (FIG. 2) and low gain regions represented by numerals I and III and therefore cannot provide satisfactory performance in all regions. Furthermore, the fuzzy controller 10 shown in FIG. 1 cannot differentiate between positive gain regions represented by numeral I in FIG. 2b and negative process gain regions represented by numeral II and therefore is not designed to give satisfactory performance in both of these regions.

One method for controlling non-linear processes having a plurality of regions of operation has been to use a plurality of conventional linear PID controllers. A scheduler is provided to monitor the process conditions and select one of the plurality of conventional linear PID controllers based on process conditions. This method of process control is known and is frequently referred to as gain scheduling.

Figure 3:
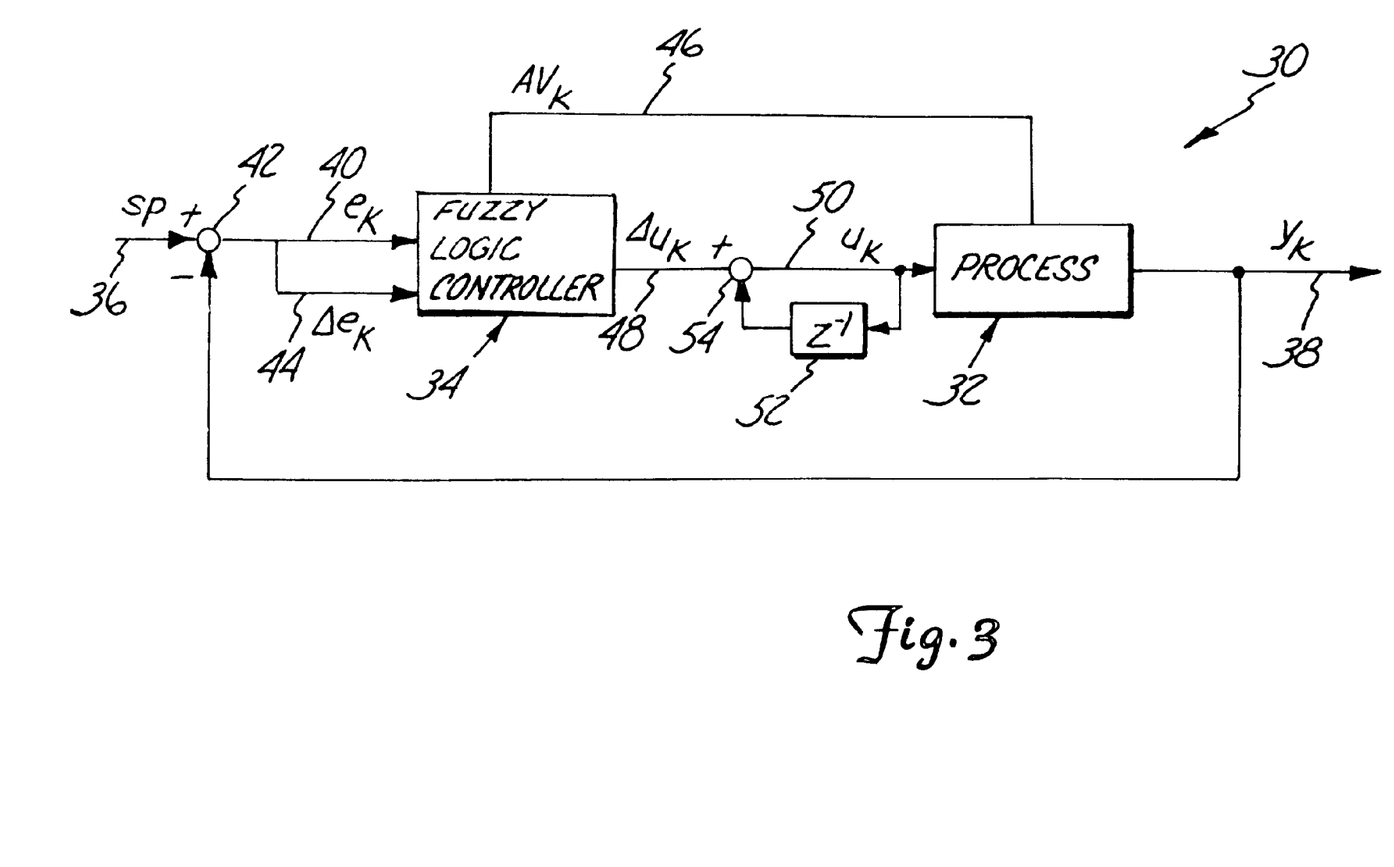
FIG. 3 is a block diagram of the fuzzy controller system of the present invention, which utilizes an auxiliary process variable to determine where the process is operating and compensate for gain non-linearity.

FIG. 3 shows the process control system 30 of the present invention which is capable of determining in which region of a non-linear process the process is operating and provides a process control signal which corresponds to this region. In this manner, the fuzzy control system 30 is capable of assuring stability in the high process gain region indicated by numeral II without sacrificing performance in the low process gain regions indicated by numerals I and III of FIG. 2a. In addition, as another example, the fuzzy control system 30 is capable of distinguishing between the positive process gain region indicated by numeral I in FIG. 2b from the negative process gain region indicated by numeral II and thereby providing negative feedback in one region and positive feedback in the other, respectively.

The fuzzy control system 30 of the present invention includes a non-linear process 32 and a fuzzy logic controller 34 for providing a control input to the process so that a process output is uniform across each of the regions of process operation.

The fuzzy control system 30 receives a continuous input signal or setpoint 36 and provides a continuous process output signal 38 designated, y, that has a fuzzy variable value designated $y_K$. An error signal 40 designated, e, that has a fuzzy variable value designated $e_K$ is provided by a combining means 42 which combines the process output signal 38 with the process input signal 36. The fuzzy logic controller 34 also receives a change in process error signal 44 designated Δe that has a fuzzy variable value designated $\Delta e_K$ from signal combining means 42. The change in process error signal 44 represents the change in the process error signal 40 over a selected sampling interval.

An important aspect of the fuzzy control system 30 of the present invention is the use of an auxiliary variable signal 46 designated AV that has a fuzzy variable value designated $AV_K$ which is provided by the process 32 to the fuzzy logic controller 34 for determining where the non-linear process is operating so that the fuzzy logic controller 34 can provide satisfactory performance in all regions of process operation. Fuzzy control systems that utilize fuzzy logic controllers such as that shown in FIG. 1 which do not make use of an auxiliary variable signal 46 cannot differentiate between operation at different points in the process non-linearity and therefore cannot properly compensate for this process non-linearity. Therefore, the use of an auxiliary variable signal 46 by the fuzzy logic controller 34 improves the process performance in all regions of operation.

The fuzzy logic controller 34 includes a fuzzification portion, a fuzzy engine, and a defuzzification portion similar to the fuzzy logic controller 10 shown in FIG. 1. However, instead of converting only the process error signal (e) and the process change in error signal (Δe), the fuzzification portion of fuzzy logic controller 34 also converts the auxiliary process variable signal 46 (AV) into a fuzzy variable. These fuzzy variables are applied to fuzzy rules by the fuzzy engine to provide a fuzzy inference. This fuzzy inference, which is in the form of a fuzzy variable, is converted to a continuous signal by the defuzzification portion of the fuzzy logic controller 34. This defuzzified output signal from fuzzy logic controller 34 represents a process input signal 48 that is designated Δu and that has a fuzzy variable value designated $\Delta u_K$.

The process input or control signal 48 ($\Delta u_K$) provided by the fuzzy logic controller 34 is a change in process input signal. Therefore, the instantaneous process input 50 designated $u_K$ is determined by a summation of all previous control actions. This summation is represented by delay portion 52 which provides the previous instantaneous process input signal $u_K$ which is summed with the change in process input signal 48 ($\Delta u_K$) by summing means 54.

The auxiliary variable ($AV_K$) should be selected so that the operation regions of the non-linear variable can be defined. The instantaneous process input 50 ($u_K$) or the process output signal 38 ($y_K$) may be used as the auxiliary variable ($AV_K$) depending on how the operation regions are defined. For example, the process output signal ($y_K$) may be used as the auxiliary variable ($AV_K$) for the case where the gain is sinusoidal as shown by plot 24 in FIG. 2a. However, in FIG. 2b the process input signal ($u_K$) should be used as the auxiliary variable ($AV_K$) for the case when the process gain changes signs as shown by plot 26 in FIG. 2b.

Figures 4A, 4B:
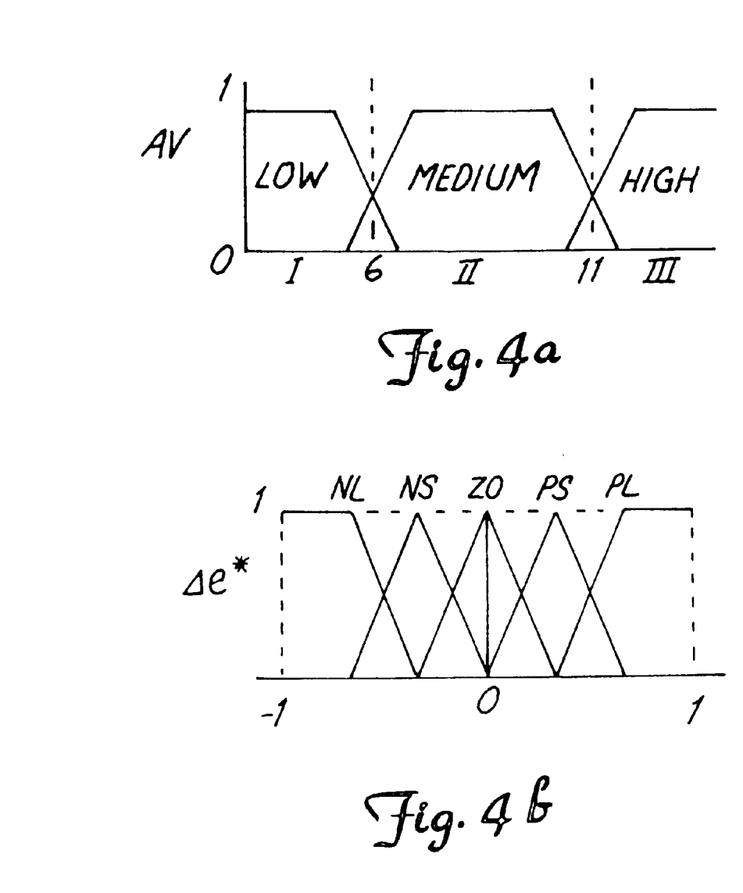
FIG. 4a is an auxiliary variable membership function definition for a fuzzy controller having three regions of operation as shown in FIG. 3.
FIG. 4b is a rate of change in error membership function definition for the fuzzy controller shown in FIG. 3.
Figure 4C:
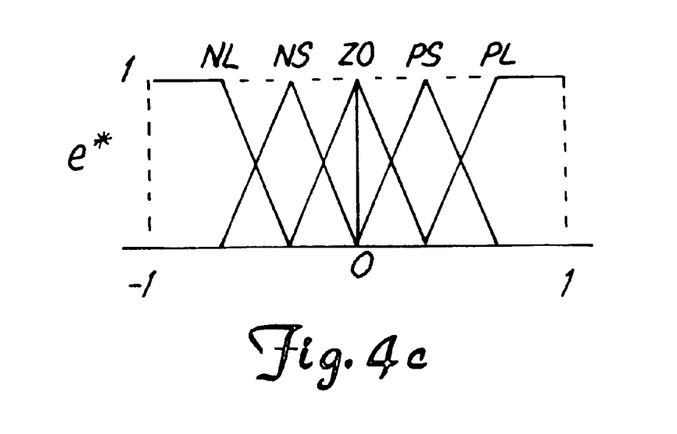
FIG. 4c is a change in error membership function definition for the fuzzy controller shown in FIG. 3.
Figure 4D:
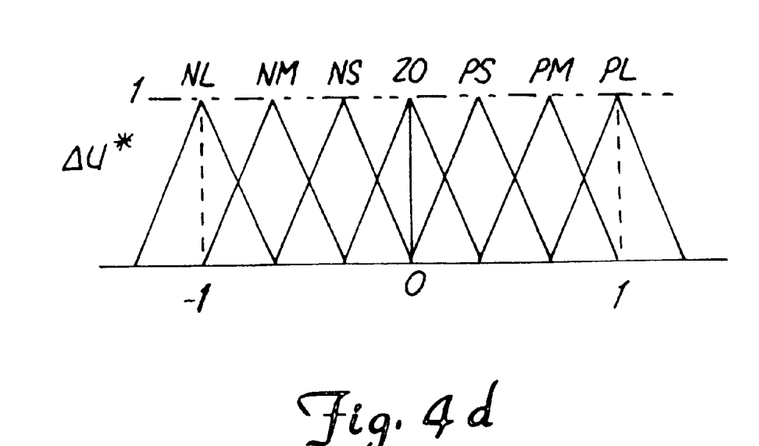
FIG. 4d is a change in process control membership function definition for the fuzzy controller shown in FIG. 3.

The fuzzy membership functions or rules which are stored in the fuzzy logic controller 34 are defined based on prior knowledge or predetermined characteristics of the process 32. The membership function is defined so that the process 32 is compensated for undesirable system behavior. As an example, a membership function for a process having a sinusoidal non-linear gain as shown in FIG. 2a is used to illustrate the definition of the membership function. For the case of the sinusoidal non-linear system the auxiliary variable ($AV_K$) should have three regions corresponding to the three distinct process gain regions of FIG. 2a. The membership function for the auxiliary variable ($AV_K$) is shown in FIG. 4b. The fuzzy variable associated with each of the three regions designated by numerals I, II, and III are "low", "medium", and "high", respectively. The fuzzy membership functions for change in process error ($\Delta e_K$), process error ($e_K$) and change in process input ($\Delta u_K$) are shown in FIGS. 4c, 4b, and 4d, respectively. In FIGS. 4b, 4c, and 4d, NL represents the fuzzy variable negative large, NM represents the fuzzy variable negative medium, NS represents the fuzzy variable negative small, ZO represents the fuzzy variable zero, PS represents the fuzzy variable positive small, PM represents the fuzzy variable positive medium, and PL represents the fuzzy variable positive large. Each of the fuzzy variables, control error (e), change of control error (Δe) and change in process input (Δu) are normalized in a conventional manner as shown in equations 1, 2, and 3, respectively.

$$e^* = e/S_e \quad (1)$$

$$\Delta e^* = \Delta e/S_{\Delta e} \quad (2)$$

$$\Delta u^* = \Delta u/S_{\Delta u} \quad (3)$$

Where $e^*$, $\Delta e^*$, and $\Delta u^*$ are the scaled membership functions shown in FIGS. 4b, 4c, and 4d, respectively and $S_e$, $S_{\Delta e}$, and $S_{\Delta u}$, are scaling factors for the fuzzy variables e, Δe, and Δu, respectively.

After defining the fuzzy variables for the controlled process, the fuzzy inference rules must then be defined. An example of a general fuzzy inference rule is described as follows:

If $AV$ is $A_i$ and $e$ is $B_i$ and $\Delta e$ is $C_i$, then make $\Delta u\ D_i$, (4)

where $A_i$, $B_i$, $C_i$, and $D_i$ are adjectives representing variable values for AV, e, $\Delta e$, and $\Delta u$, respectively. These adjectives or variable values could be descriptors such as negative small, positive large, and zero. Fuzzy rules are derived from experience of human operators controlling the process for which the fuzzy controller will be used.

The fuzzy inference rules define the response by the fuzzy logic controller 34 to a particular process condition. For example, when the process is operating in the low gain region, aggressive control action is required. On the other hand, when the process is in a high gain region, mild to low control action should be used to ensure stability of the system. Within each region I, II, and III of the process shown in FIG. 2a for which there is a corresponding region for the auxiliary variable (AV), rules can be defined for a conventional fuzzy-type controller. In this manner, three proportional-integral (PI) type fuzzy controllers are designed in a conventional manner to provide proper compensation when the process is operated in the selected region. An example of fuzzy inference rules for the sinusoidal non-linear process of FIG. 2a is shown in FIG. 5.

Figure 5:
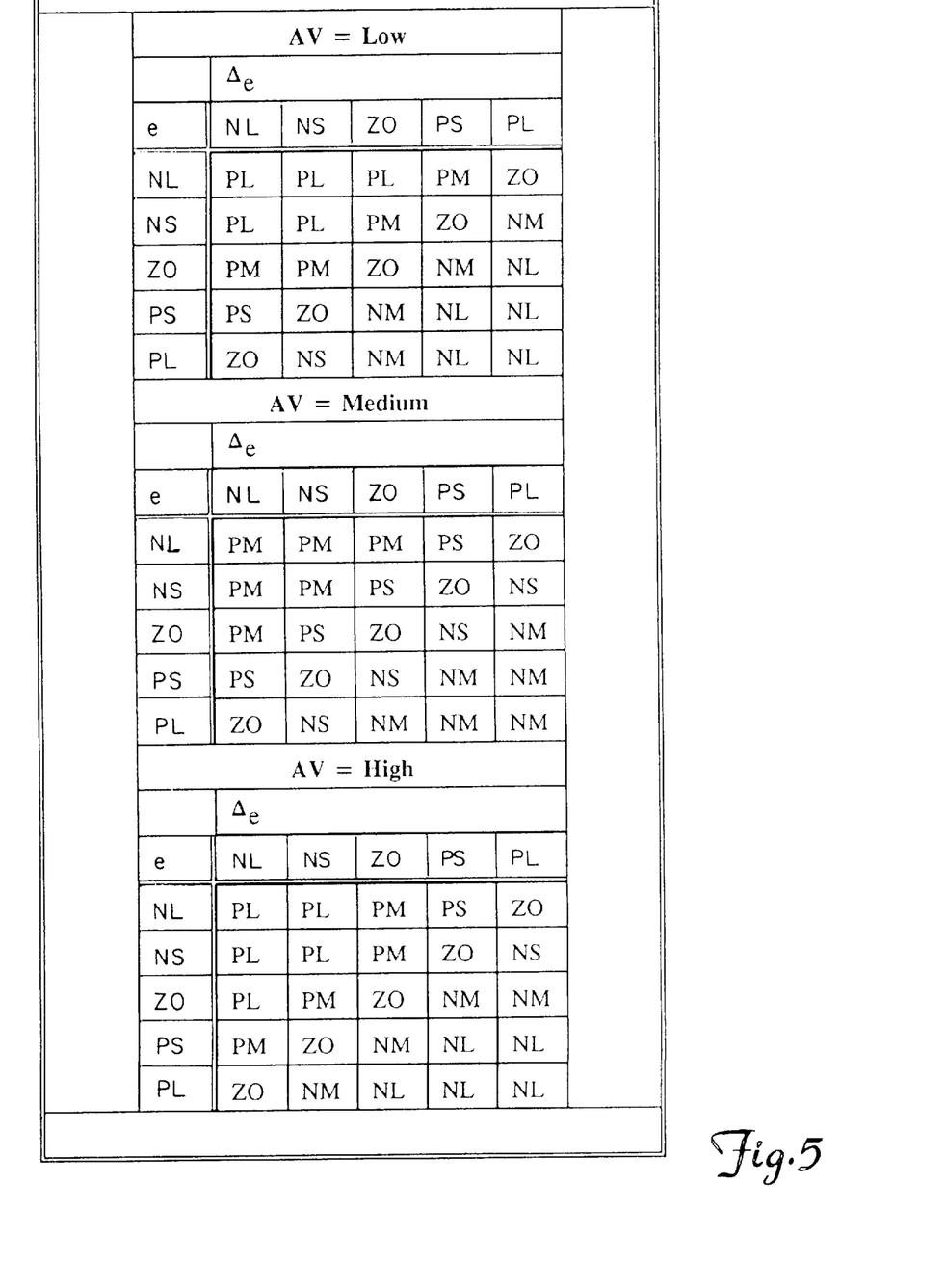

As shown in FIG. 5, these fuzzy inference rules are in three separate sets with the first set corresponding to the auxiliary variable ($AV_K$) in a low condition as defined in FIG. 4a, the second set corresponding to the auxiliary variable ($AV_K$) in a medium condition as defined in FIG. 4a and the third set corresponding to the auxiliary variable ($AV_K$) in a high condition as defined in FIG. 4a. In this manner, the auxiliary variable $AV_K$ (which has three regions having variable values low, medium, and high that correspond to the three regions shown in FIG. 2a labeled numeral I, II, and III, respectively) can be used to select the corresponding set of fuzzy rules designed for control of that particular region of process operation.

From FIG. 5, when the auxiliary variable is either low or high and when the error and change in error variables have values that are either negative large or negative small, the fuzzy controller output signal has a value ($u_K$) that is equal to positive large. The fuzzy logic output variables are either positive large or negative large when the auxiliary value is either high or low which corresponds to low gain regions of the non-linear process. The process control is more aggressive in these low gain regions to provide better response times. In contrast, the fuzzy membership rules which correspond to the auxiliary variable having a medium value which corresponds to the high gain region the control variable is never large in order to maintain stability in this operating region.

An important aspect of the present invention is that the fuzzy rules for each region of the non-linear process can be consolidated where possible. For example, the process control variable has a zero value for the same value of variables $e_K$ and $\Delta e_K$, no matter what the auxiliary value $AV_K$ is. By combining these rules in FIG. 5, ten rules can be eliminated without changing functionality. Moreover, if the fuzzy control rules where identical or both conditions where the auxiliary variable value low or high, then 25 of the fuzzy control rules can be eliminated. In this manner, rule reduction can be done by combining identical rules for different values of the auxiliary variable.

For a three-region fuzzy controller using five variables, there are 75 possible rules. If the controller requires the use of seven adjectives, then 147 rules are required. Therefore, the total number of rules can be reduced by reducing the number of variables. In addition, as discussed previously, the number of rules can be reduced by combining or consolidating identical rules used in different regions of process operation. This reduction of rules reduces both the computing time required by the fuzzy logic controller 34 and the memory required to store each of these rules within the fuzzy logic controller.

After both the fuzzy variables are selected and the fuzzy rules are defined, the multi-region fuzzy controller 34 must be tuned. Tuning is a process which includes: (i) tuning of the scaling factors, (ii) tuning of the fuzzy membership functions, (iii) tuning of the fuzzy rules, and (iv) tuning of the auxiliary variable (AV) membership functions for smooth regional transitions. The scaling factors should be tuned first because they are global tuning parameters that affect the overall control performance. A membership function, which has an effect on one subset of rules, can be tuned second. Individual fuzzy rules should be tuned last because they affect only specific singular outcomes.

Within each region, the fuzzy controller 34 can be tuned using conventional techniques similar to that used for a fuzzy PI controller. For a PI controller that can be represented by the following equation:

$$y(t) = K_p\left(e(t) + \frac{1}{T_i}\int e(t)dt\right) \quad (5)$$

$K_p$ and $T_i$ are related to the scaling factors by the following equations:

$$K_p = S_{\Delta u}/S_{\Delta e} \quad (6)$$

$$T_i = (S_e/S_{\Delta e})\Delta t \quad (7)$$

Where $K_p$ is the proportional gain, $T_i$ is the integral time constant, and $\Delta t$ is the controller sampling time constant. Therefore, the proportional action is increased by either increasing $S_{\Delta u}$ or decreasing $S_{\Delta e}$. The integral control action is increased by either decreasing $S_e$ or increasing $S_{\Delta e}$ because the small integral time constant represents strong integral control action. Although a change in the controller sampling time ($\Delta e$) also affects the integral time, controller sampling time is normally not used as a tuning factor.

After the fuzzy controller 34 is tuned in each region, the fuzzy controller tuning should be coordinated over all regions. If the scaling factor $S_{\Delta u}$ is used to tune the low gain region, the high gain region can only be tuned by adjusting the position of the related membership functions. To achieve smooth transition between regions, the membership functions for AV can be tuned by experience and trial and error. In summary, the following procedures used to tune the multi-region fuzzy controller 34: (1) tune the scaling factors ($S_e$, $S_{\Delta e}$, and $S_{\Delta u}$) for the low gain region; (2) tune the position of the related membership function for $\Delta u$ in the high gain region; (3) tune the fuzzy controller 34 over all regions to achieve smooth transitions of control; and (4) fine tune the membership functions and the rules to achieve desired control performance.

Figure 6:
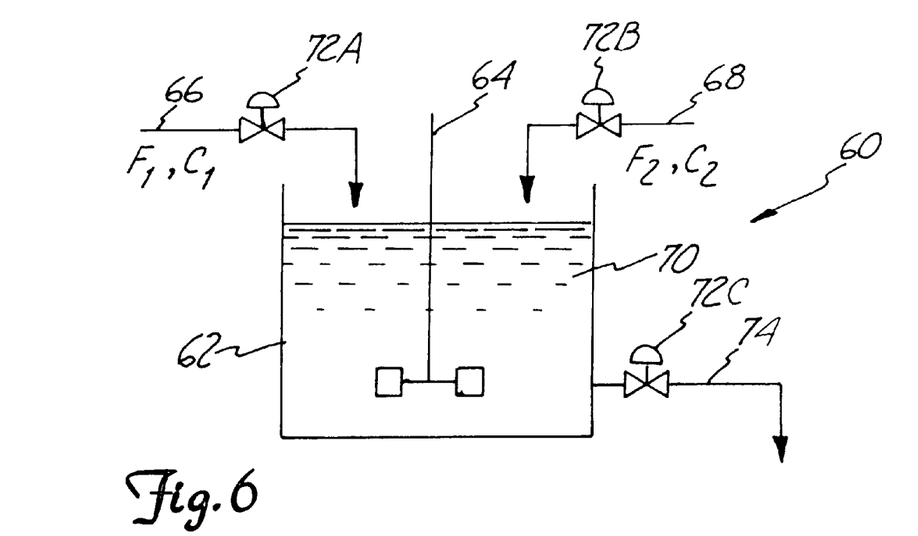
FIG. 6 is a continuously stirred tank reactor for pH titration control.

The following is an example of the fuzzy control system 30 of the present invention that is used to control a continuously stirred tank reactor (CSTR) for pH titration as shown in FIG. 6. The CSTR 60 includes a tank 62 having a stirring means 64 and two input streams, an acid stream 66 having a flow rate designated $F_1$ and a concentration represented by the variable $C_1$, and a base stream 68 having a flow rate designated $F_2$ and a concentration represented by the variable $C_2$. In this example, the flow rate $F_1$ of the acid stream 66 is used to control the pH value of a solution 70 within tank 62. The concentration $C_2$ of the base stream 68 is used as a disturbance which is to be compensated for by the fuzzy control system 30 of the present invention. The pH of the solution 70 is measured as the solution streams from the tank 62 and 70. Valves 72A, 72B and 72C are provided for controlling the flow of acid stream 66, base stream 68 and solution stream 74.

Assuming an ideal CSTR 60 that is perfectly controlled, the relationships between the volume of solution 70 in tank 62 and the flow rates $F_1$, $F_2$ of the acid and the base and the concentrations $C_1$ and $C_2$ of the acid and base are known, as is the relationship of these flow rates to the pH of the tank, shown generally in the following equations:

$$V \frac{d\zeta}{dt} = F_1 C_1 - (F_1 + F_2)\zeta \quad (8)$$

$$V \frac{d\xi}{dt} = F_2 C_2 - (F_1 + F_2)\xi \quad (9)$$

$$[H^+]^3 + (K_a + \xi)[H^+]^2 + (K_a(\xi - \zeta) - K_w)[H^+] - K_w K_a = 0 \quad (10)$$

$$pH = -\log_{10}[H^+] \quad (11)$$

$$\zeta = [HAC] + [AC^-] \quad (12)$$

$$\xi = [Na^+] \quad (13)$$

Where the physical meaning of each variable and associated initial values are shown in Table 1.

TABLE 1

| Variable | Meaning | Initial Setting |
| --- | --- | --- |
| V | Volume of Tank | 1000 Liters |
| $F_1$ | Flow Rate of Acid | 81 Liters/min |
| $F_2$ | Flow Rate of Base | 512 Liters/min |
| $C_1$ | Concentration of Acid in $F_1$ | 0.32 moles/liter |
| $C_2$ | Concentration of Acid in $F_2$ | .05005 moles/liter |
| $K_a$ | Acid Equilibrium Constant | $1.8 \times 10^{-5}$ |
| $K_w$ | Water Equilibrium Constant | $1.0 \times 10^{-14}$ |

Figure 7:
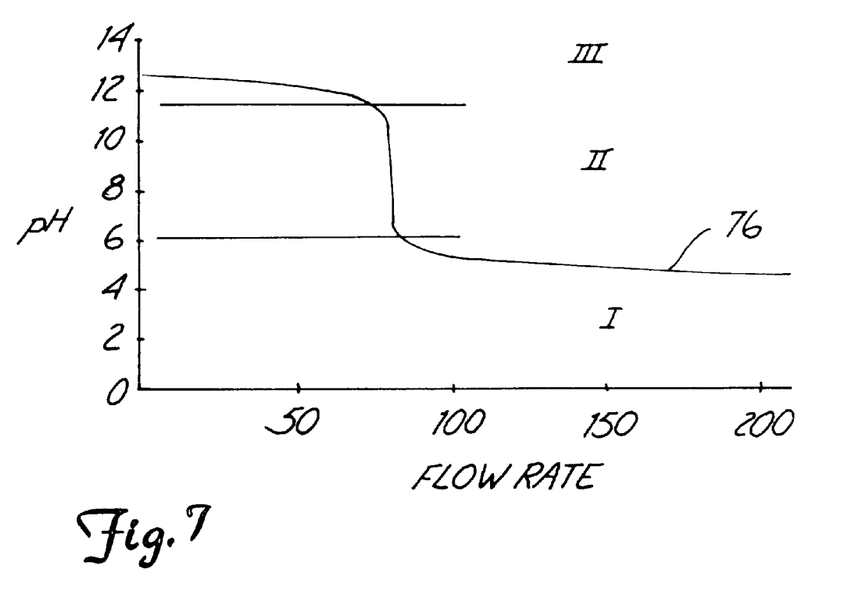
FIG. 7 is a graph showing the relationship between flow rate of acid and pH.

The steady state non-linear relationship between the flow rate of acid ($F_1$) and the pH of the solution 70 is shown by plot 76 in FIG. 7. The plot 76 in FIG. 7 has three regions of non-linear gain indicated by numerals I, II, and III which correspond to low pH, medium pH, and high pH, respectively. The process gain is very small in the regions of low and high pH identified by numerals I and III, while the process gain is extremely high in the region of medium pH identified by numeral II. In the high gain region indicated by numeral II, a small change in the acid flow rate ($F_1$) results in a large change in pH value, while in the low gain regions identified by numerals I and III, considerable change must be made in the acid flow rate ($F_1$) to make an appreciable change in the pH value. The CSTR system 60 presents a difficult task for a conventional PI-type controller. The process input signal provided by the controller must be relatively small to maintain good stability in the high process gain region without sacrificing too much dynamic response in the low process gain region.

The fuzzy logic control system 30 of the present invention provides good control of pH values over each of the three regions identified by numerals I, II, and III in FIG. 7. Using the pH value as an auxiliary variable (AV), a set of fuzzy rules can be defined for each of the three regions of process gain defined in FIG. 7. These fuzzy rules are defined using human knowledge of the process depicted in the steady state relationship of pH and acid flow rate ($F_1$) shown in FIG. 7.

Figure 8A:
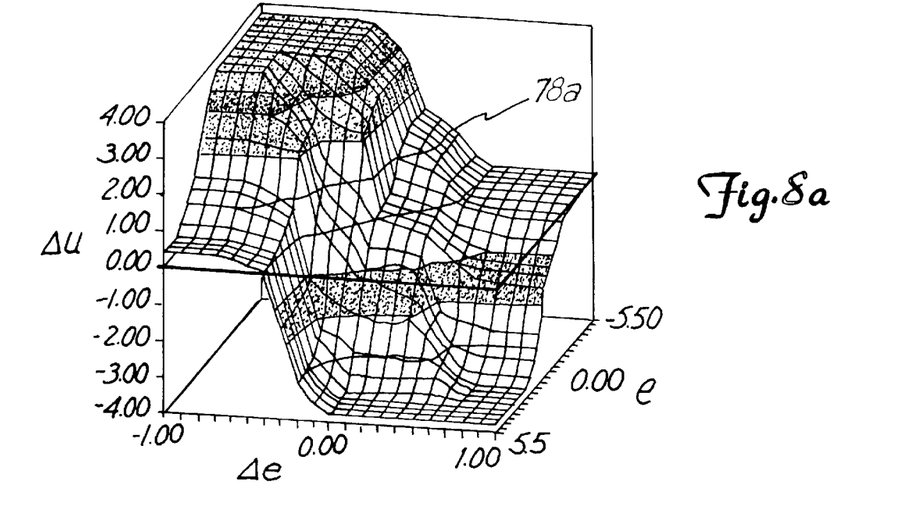
FIG. 8a is a control surface showing the relationship between process error, process change in error, and change in process control for the titration controller for the tank reactor shown in FIG. 6 when the pH is 13.
Figure 8B:
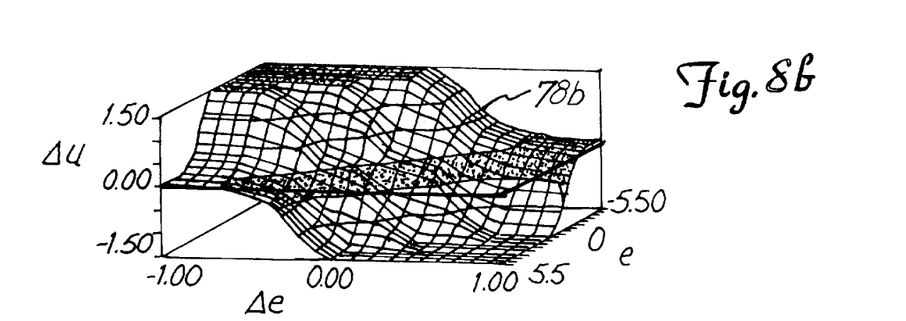
FIG. 8b is a control surface showing the relationship between error, change in error, and change in process control for the tank reactor shown in FIG. 6 when the pH is 9.
Figure 8C:
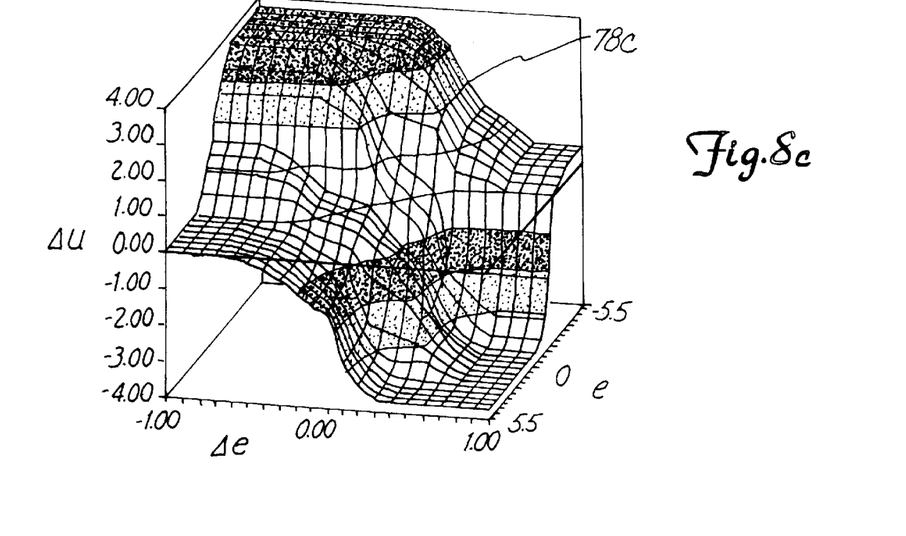
FIG. 8c is a control surface showing the relationship between error, change in error, and change in process control for the tank reactor shown in FIG. 6 when the pH is 4.

FIGS. 8a, 8b, and 8c represent the relationship between the change in process input on control signal ($\Delta u$), process error (e) and change in process error ($\Delta e$) for each region of process gain pH high, pH medium, and pH low, respectively. The process control action versus control error and change in control error shown in FIGS. 8a, 8b, and 8c are frequently referred to as "control surfaces" or "control response surfaces" indicated by reference numerals 78a, 78b and 78c, respectively. It can be seen from these control surfaces 78a, 78b and 78c that for identical process control error and change in process control error, the control action provided by the fuzzy logic controller 34 is different depending on whether the processes operating in a high gain region or a low gain region. For process operation in either of the low gain regions shown in FIG. 8a and FIG. 8c, the control action is more aggressive as evidenced by the magnitude of the change in process input signal ($\Delta u$). In contrast, process operation in the high gain region shown in FIG. 8b, the control action is much less aggressive as evidenced by the relatively small change in process input signal ($\Delta u$). This variation in control response in regions of differing gain cannot be accomplished by the conventional fuzzy controller 10 shown in FIG. 1. In addition, the control surfaces shown in FIGS. 8a, 8b, and 8c are fairly non-linear, which is a feature which cannot be achieved by conventional PID-type controllers. The transient regions between each of the three gain regions, low, medium, and high are an interpolation of the three control surfaces implied defuzzification.

Figure 9A:
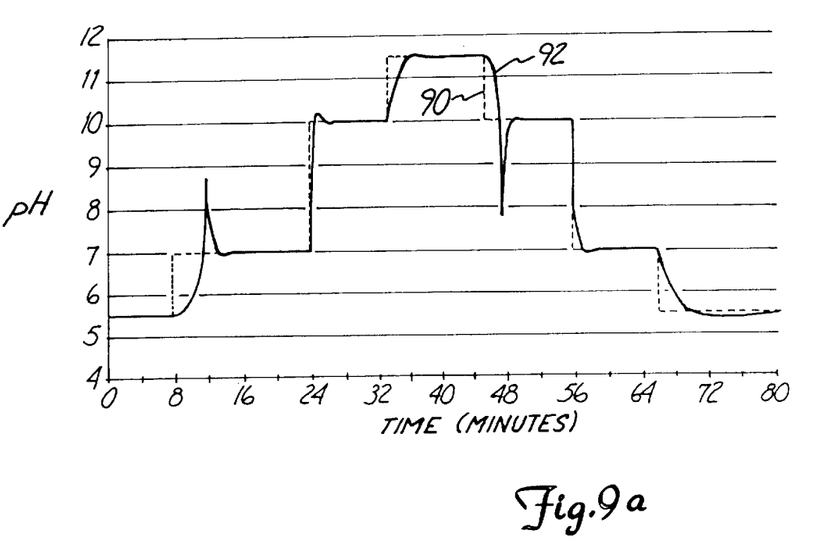
FIG. 9a is a graph showing the step response of the tank reactor shown in FIG. 6 when controlled by a three-region fuzzy controller of the present invention.

FIG. 9a shows a step response of the CSTR 60 controlled by the three-region control system 30 of the present invention. The step response represents the relationship between pH of the solution 70 and time for step changes in the setpoint signal 36. The setpoint is changed from 5.5 to 7.0, to 10.0, to 11.5, and then from 11.5 to 10.0, to 7.0, and to 5.5 so that the control performance is evaluated over each of the three process gain regions. For each of the setpoint changes the dynamic response or time required to compensate for these changes can be seen. The setpoint value is shown by plot 90 and the measured pH value of solution 70 is shown by plot 92. The system response time varies depending on the gain region and direction of change. For example, the step change from a low gain region to a high gain region produces a large overshoot. However, a step change from a high gain region to a low gain region produces little overshoot.

Figure 9B:
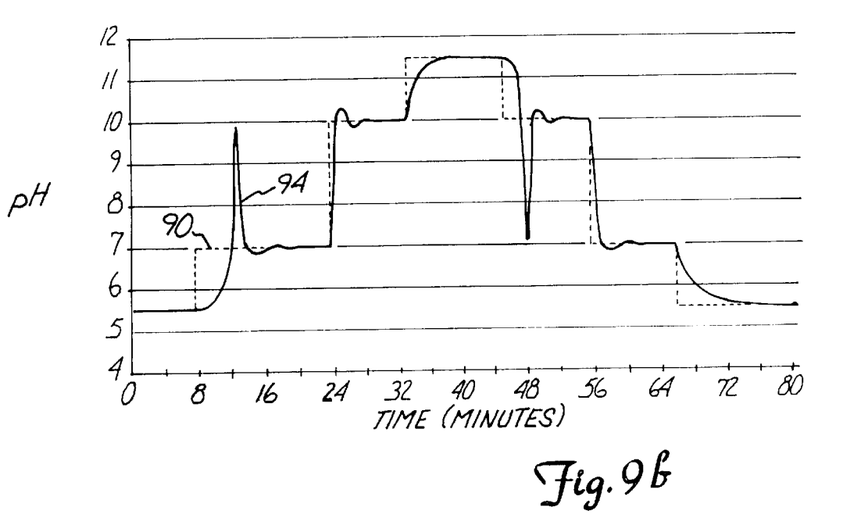
FIG. 9b shows the step response of a tank reactor shown in FIG. 6 controlled by a conventional PI-type fuzzy controller.

FIG. 9b is the step response of the pH controller for the continuously stirred tank reactor using a conventional PI-type fuzzy controller for comparison. FIG. 9b shows a plot 94 of the pH of solution 70 and the identical step response 90 from FIG. 9a with relation to time. To assure stability in all three regions, the controller 34 must have a gain that is carefully adjusted so that the continuously stirred tank reactor is stable in the high process gain region indicated by numeral II in FIG. 7. A comparison of the response of the three-region fuzzy logic controller of the present invention (shown in FIG. 9a) with the response of the conventional one-region fuzzy logic controller (shown in FIG. 9b) illustrates that the three-region fuzzy logic controller has less overshoot in moving from the low gain region to the high gain region. In addition, the overall settling time for the three-region controller is less than that for the one-region controller.

Figure 10:
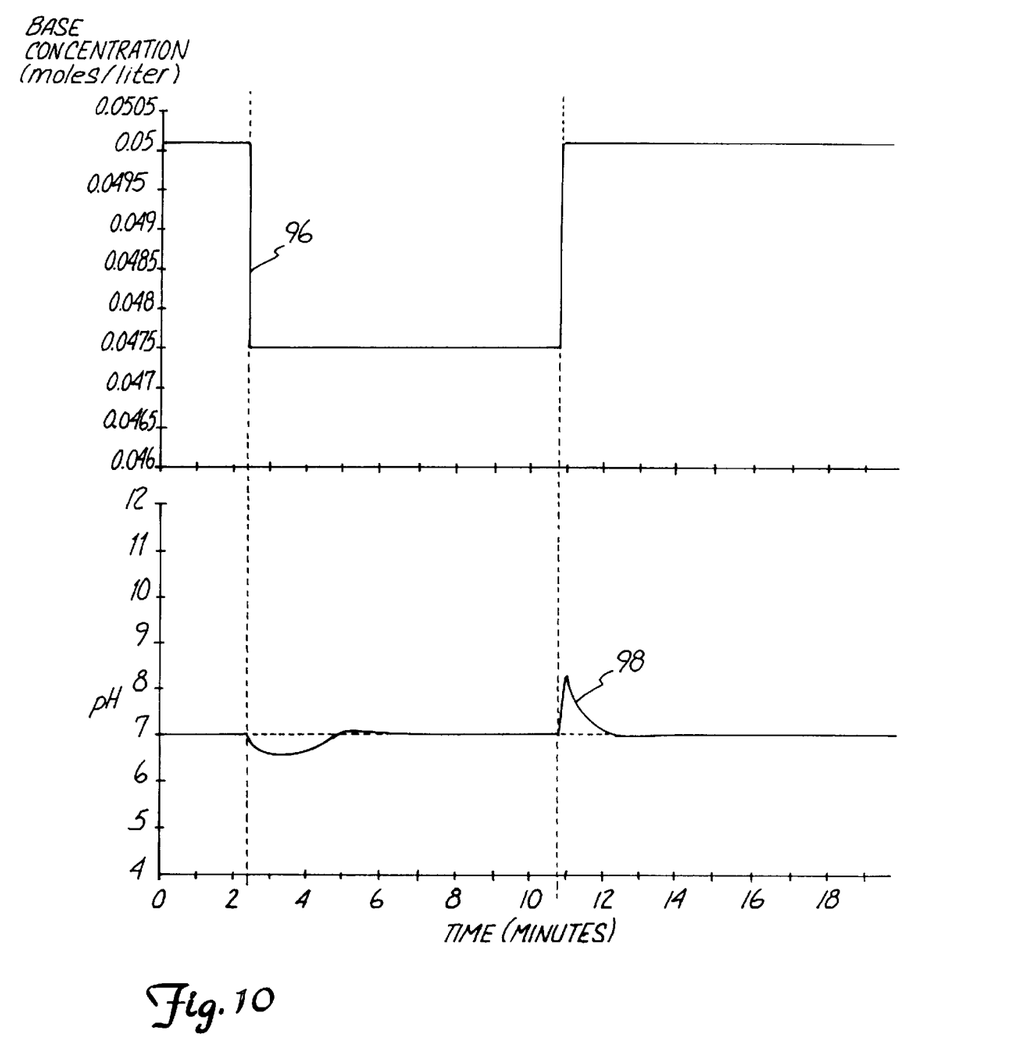
FIG. 10 shows the pH control performance for positive and negative disturbances in the base concentration for the three-region fuzzy controller of the present invention.

FIG. 10 shows the three-region fuzzy controller performance in the presence of disturbances in base concentration. A plot 96 shows the base concentration ($C_2$) with respect to time and plot 98 is the pH of solution 70 with respect to time. Both positive and negative base concentration disturbances are applied while the pH setpoint is fixed at 7. As can be seen from plot 98, the three region fuzzy controller performs well in rejecting disturbance changes in either positive or negative directions.

In conclusion, the multi-region fuzzy logic control system 30 of the present invention is capable of compensating for non-linear process gain and yields better control performance than a single-region fuzzy controller. The control system 30 uses an additional process variable as the auxiliary variable to detect where the process is operating. The multi-region fuzzy control system 30 is well suited for controlling processes having dramatic non-linear gain changes.

Although the fuzzy logic controller 34 is described as using the fuzzy engine to distinguish between operation in different portions of the process, this function can be performed as well outside the fuzzy engine. For example, a separate circuit can be used to monitor the auxiliary variable and select the appropriate set of fuzzy rules based on the region the process is operating. In addition, the rule acquisition for the fuzzy controller 34 was previously described as being acquired from a human operator. However, a fuzzy/neuro architecture can be used instead for acquisition of fuzzy rules.

In operation, the fuzzy logic controller 34 of the multi-region fuzzy control system 30 of the present invention determines a region of process operation based on an auxiliary variable value $AV_K$ of process 32. A fuzzy membership function associated with the region of process operation is selected from at least two fuzzy membership functions each having an associated region of process operation. A process control signal value is inferred by the fuzzy logic controller 34 based on the selected fuzzy membership function and the process error signal values $e_K$ and $\Delta e_K$.

The above process is performed at selected time intervals so that changes in regions of process operation are detected and the appropriate process control signal is provided to the process 32 to ensure proper process operation across all regions of process operation.

Although the present invention has been described with reference to preferred embodiments, workers skilled in the art will recognize that changes may be made in form and detail without departing from the spirit and scope of the invention.

What is claimed is:

1. A control system for controlling a non-linear process as a function of a process error signal, the non-linear process having a plurality of regions of operation, the control system comprising:

means for producing an auxiliary variable signals which is indicative of an instantaneous region of operation for the non-linear process, the instantaneous region of operation being one of the plurality of regions of operation; and a fuzzy logic controller for producing a process control output signal for controlling the non-linear process in the instantaneous region of operation as a function of the process error signal and the auxiliary variable signal.

2. The control system of claim 1 further including means for producing a change in process error signal and wherein the fuzzy logic controller is configured for producing the process control output signal as a function of the process error signal, the change in process error signal and the auxiliary variable signal.

3. The control system of claim 1 wherein the fuzzy logic controller is configured to produce the process control output signal for producing proportional and integral control for the non-linear process.

4. The control system of claim 1 wherein the fuzzy logic controller is configured to produce the process control output signal that produces proportional, integral and derivative control for the non-linear process.

5. The control system of claim 1 wherein the fuzzy logic controller is configured to produce the process control output signal as a function of the process error signal and a plurality of sets of fuzzy rules for the plurality of regions of operation for the non-linear process, respectively, the fuzzy logic controller selecting one of the plurality of sets of fuzzy rules based upon the auxiliary variable signal.

6. The control system of claim 1 wherein the fuzzy logic controller includes:

fuzzification means for converting the process error signal to a fuzzy process error signal value;

fuzzy engine means for producing a fuzzy process control output signal value as a function of the fuzzy process error signal value and the auxiliary variable signal; and defuzzification means for converting the fuzzy process control output signal value to the process control output signal.

7. The control system of claim 6 wherein the fuzzification means is configured for converting the auxiliary variable signal to a fuzzy auxiliary variable value and wherein the fuzzy engine is configured for producing the fuzzy process control output signal as a function of the fuzzy auxiliary variable value and a plurality of sets of fuzzy rules for the operating regions of the process with the fuzzy engine means selecting one of the plurality of sets of fuzzy rules based upon the fuzzy auxiliary variable value.

8. A control system for producing derivative, proportional and integral control of a process having non-linear process gain for each of a plurality of different operating regions of the process, the control system comprising:

means for producing an auxiliary value indicative of an operating region in which the process is operating wherein the operating region in which the process is operating is one of the plurality of different operating regions of the process; and a fuzzy logic controller for producing a process control signal value which provides proportional, integral and derivative control of the process for the operating region in which the process is operating, the process control signal value being a function of a process signal error value, change in process error value, and the auxiliary value.

9. The control system of claim 8 wherein the process control signal value is produced as a function of a plurality of sets of fuzzy rules for the different operating regions of the process, the fuzzy logic controller selecting one of the plurality of sets of fuzzy rules based upon the auxiliary variable value.

10. The control system of claim 8 wherein the fuzzy logic controller includes:

fuzzification means for converting the process error signal to a fuzzy process error signal value and converting the change in process error signal to a fuzzy change in process error signal value;

fuzzy engine means for producing a fuzzy process control output signal value as a function of the fuzzy process error signal value, the fuzzy change in process error signal value and the auxiliary variable signal; and defuzzification means for converting the fuzzy process control output signal value to the process control signal value.

11. The control system of claim 10 wherein the fuzzification means is configured for converting the auxiliary variable signal to a fuzzy auxiliary variable value and wherein the fuzzy engine is configured for producing the fuzzy process control output signal as a function of the fuzzy auxiliary variable value and a plurality of sets of fuzzy rules for the different operating regions of the process with the fuzzy engine selecting one of the plurality of sets of fuzzy rules based upon the fuzzy auxiliary variable value.

12. A control system for controlling a non-linear process as a function of a process error signal and a process change in error signal, the non-linear process having a plurality of operating regions, the control system comprising:

means for producing an auxiliary variable signal which is indicative of a region of operation in which the non-linear process is operating, wherein the region of operation is one of the plurality of operating regions; and a fuzzy logic controller for producing a process control output signal as a function of the process error signal, the process change in error signal, and a plurality of sets of fuzzy rules for the different operating regions of the process, the fuzzy logic controller selecting one of the plurality of sets of fuzzy rules based upon the auxiliary variable signal.

13. The control system of claim 12 wherein the fuzzy logic controller is configured to produce the process output signal that provides proportional and integral control for the non-linear process.

14. The control system of claim 12 wherein the fuzzy logic controller is configured to produce the process output signal that produces proportional integral and derivative control for the non-linear process.

15. A control system for controlling a non-linear process as a function of a process error signal and a process change in error signal, the control system comprising:

means for producing an auxiliary variable signal to define an identified region of process operation from a plurality of operating regions for the non-linear process; and a fuzzy logic controller for producing a process control output signal for controlling the non-linear process in the identified region as a function of the process error signal, the process change in error signal and the auxiliary variable signal.

16. The control system of claim 15 wherein the fuzzy logic controller is configured to produce the process control output signal for providing proportional and integral control for the non-linear process.

17. The control system of claim 15 wherein the fuzzy logic controller is configured to produce the process control output signal for producing proportional, integral and derivative control for the non-linear process.

18. The control system of claim 15 wherein the fuzzy logic controller is configured for producing the process control output signal as a function of a plurality of a plurality of sets of fuzzy rules for the different operating regions of the process, the fuzzy logic controller selecting one of the plurality of sets of fuzzy rules based upon the auxiliary variable signal.

19. A system for controlling a non-linear process comprising:

means for producing a controller parameter value indicative of an instantaneous region of process operation, the instantaneous region of process operation being one of a plurality of operating regions for the non-linear process; and a fuzzy engine linked to the non-linear process for producing a process control output signal as a function of the process error signal, the controller parameter value and one of a plurality of sets of fuzzy rules for the different operating regions of the process.

20. A control system suited for producing a process control signal for controlling a non-linear process having first and second regions of operation, the control system comprising:

means for producing an auxiliary process signal having predetermined characteristics in each of first and second regions of process operation;

a fuzzy logic controller including:

a first fuzzy membership function relating a process error signal to the process control signal for process operation in the first region;

a second fuzzy membership function relating the process error signal to the process control signal for process operation in the second region; and a fuzzy inference engine for applying one of the first and second fuzzy membership functions selected based on the auxiliary process signal to a process error signal value for inferring a process control signal value.

21. The control system of claim 20 wherein the first fuzzy membership function relates the process error signal to the process control signal to produce proportional and integral control for the first region of process operation and the second fuzzy membership function relates the process error signal to the process control signal to produce proportional and integral control for the second region of process operation.

22. The control system of claim 20 and further including signal combining means for combining a setpoint value and a process output signal value to produce a process error signal value and a change in process error value.

23. The control system of claim 20 wherein the auxiliary process signal is the process control signal value.

24. The control system of claim 20 wherein the auxiliary process signal is a process output signal value.

25. The control system of claim 20 wherein the first fuzzy membership function as well as the second fuzzy membership function are fuzzy rules that if combined with fuzzy variables are evaluated by fuzzy logic to provide fuzzy inferences.

26. The control system of claim 20 wherein the first fuzzy membership function rules which are identical to the second fuzzy membership function rules are combined forming a single membership function.

27. The control system of claim 20 wherein the fuzzy inference engine selects one of the first and second membership functions based on the auxiliary process signal.

28. The control system of claim 20 and further including means for selecting one of the first and second membership functions based on the auxiliary process signal.

29. A control system for controlling a process having non-linear process gain, the process having first and second regions of process gain, the control system comprising:

a circuit, connected between a process and a fuzzy logic controller, for producing an auxiliary process variable value that is indicative of first and second regions of process gain;

the fuzzy logic controller for producing a control signal value to the process, the fuzzy logic controller including:

a first fuzzy membership function that is selected to produce proportional and integral control suitable for the first region of process gain;

a second fuzzy membership function that is selected to produce proportional and integral control suitable for the second region of process gain; and a fuzzy engine for applying one of the first and second fuzzy membership functions selected based on an indicated region of process gain determined from the auxiliary process variable value to a process error signal value and a change in process error value to infer the control signal value for maintaining proper process operation in the first and second regions of process gain.

30. A method for controlling a non-linear process as a function of a process error signal, the method comprising:

determining a region of process operation of the non-linear process from a plurality of operating regions based on an auxiliary process variable signal; and applying a selected set of fuzzy rules from a plurality of sets of fuzzy rules for the plurality of operating regions of the process to the process error signal for inferring a process control output signal, the selected set of fuzzy rules applied being based upon the operating region of the process determined from the auxiliary process variable signal.

31. The method for controlling a non-linear process of claim 30 and further including converting the process error signal to a fuzzy process error signal value and wherein applying the selected set of fuzzy rules from a plurality of sets of fuzzy rules includes selecting a fuzzy rule from the selected set of fuzzy rules based on the fuzzy process error signal for inferring a fuzzy process control signal value.

32. The method for controlling a non-linear process of claim 31 further including converting the fuzzy process control signal value to the process control output signal.

33. The method for controlling a non-linear process of claim 31 wherein selecting a fuzzy rule from the selected set of fuzzy rules is performed utilizing a fuzzy logic controller.

* * * * *